United States Patent [19]

Desjardins et al.

[11] Patent Number: 4,888,258
[45] Date of Patent: Dec. 19, 1989

[54] LITHIUM-LITHIUM NITRIDE ANODE

[75] Inventors: C. David Desjardins; Hossein Sharifian; Gregory K. MacLean, all of Fredericton, Canada

[73] Assignee: The New Brunswick Telephone Company, Limited, New Brunswick, Canada

[21] Appl. No.: 169,419

[22] Filed: Mar. 17, 1988

Related U.S. Application Data

[63] Continuation-in-part of Ser. No. 24,358, Mar. 10, 1987, abandoned, and a continuation-in-part of Ser. No. 157,493, Feb. 17, 1988, abandoned.

[51] Int. Cl.[4] .......................... H01M 6/14; H01M 4/58

[52] U.S. Cl. .................................. 429/194; 429/191; 429/218; 252/182.1

[58] Field of Search ................. 429/191, 194, 218; 252/182.1

[56] References Cited

U.S. PATENT DOCUMENTS 4,461,816 7/1984 Leribaux ............................ 429/191

Primary Examiner—Stephen J. Kalafut
Attorney, Agent, or Firm—Merchant, Gould, Smith, Edell, Welter & Schmidt

[57] ABSTRACT

An anode material comprising a solid solution of lithium metal and lithium nitride can be used in lithium-based electrochemical cells. The anode material can incorporate lithium alloys, carbon and polymeric materials.

24 Claims, 4 Drawing Sheets

POLARIZATION OF Li/Li$_3$N (11 mole %N)

LiAsF$_6$/2-MeTHF. 25C

LITHIUM-LITHIUM NITRIDE ANODE

CROSS-REFERENCE TO RELATED APPLICATIONS

This is a continuation-in-part of our prior application Ser. No. 024,358, filed Mar. 10, 1987 and application Ser. No. 157,493, filed Feb. 17, 1988. both now abandoned.

BACKGROUND OF THE INVENTION

The invention relates to the use of a mixture of lithium and nitrogen as anode material in rechargeable and non-rechargeable high energy density batteries.

The problems associated with the use of pure lithium metal anodes in electrochemical systems, and, in particular, in rechargeable cells have been well documented in the scientific and technical literature (see, for example, U.S. Pat. Nos. 4,550,064, 4,499,161, 4,118,550, 4,071,664, 4,086,403). The fundamental problem is the thermodynamic and kinetic instability of lithium towards cell materials and the electrolyte especially at the anode/electrolyte interface. In electrochemical cells, this results in corrosion/passivation of the lithium electrode. Thus, attempts to recycle lithium result in dendritic growth, formation of poorly adherent high surface area deposits of lithium metal on charging and slow chemical decomposition of the electrolyte. Ultimately, cell failure occurs due to cell shorting, depletion and/or isolation of the anode and anode passivation from electrolyte breakdown products. Short term solutions to the above problems have been to use excess lithium metal and/or conductive/protective films. Another approach has been to use composite electrodes like lithium-aluminum alloy. In such cases, an immobile host material promotes a uniform distribution of lithium having reduced chemical activity. Lithium aluminum alloys have been extensively investigated in nonaqueous electrolyte systems. However, the electrode experiences large volume changes during deposition/stripping associated with phase transformations. Such electrodes, on extensive recycling, exhibit severe mechanical instability. Other disadvantages associated with the use of alloys include large voltage and capacity losses relative to pure lithium anodes.

SUMMARY OF THE INVENTION

It has been found that the above-mentioned problems with anodes made of lithium or lithium-aluminum alloy can be reduced or avoided by the use of anodes made of a mixture of lithium and nitrogen. This invention is therefore primarily directed to lithium-based electrochemical cells having a new anode material which comprises a solid state mixture of lithium metal and nitrogen wherein the nitrogen is in the form of lithium nitride. Anodes comprising the solid mixture or solution formed from this mixture, (said mixture or solution being sometimes referred to in this specification as "Li/Li$_3$N") are intended to be used to replace the lithium anodes in lithium-based electrochemical cells. The terms "mixture" and "solution" are used interchangeably in this specification; the characterization of the solid anode material as a "mixture" or a "solution" is immaterial. The remaining elements of lithium-based electrochemical cells, such as the cathode, separator, and electrolyte, can be used without modification in electrochemical cells made according to this invention, having anodes of Li/Li$_3$N. Such elements have been extensively described in the lithium battery literature.

Mixtures of lithium and lithium nitride have been identified in the scientific literature (e.g. U.S. Pat. No. 4,447,379 to Wagner) as intermediates in the preparation of a solid electrolyte and lithium nitride has been used as a solid ion conductor in solid state cells as reviewed by A. Rabenau (*Solid State Ionics*, 6 (1982) 277). Surface films of Li$_3$N on lithium foil anodes have also been investigated by Thevenin et al. (Lawrence Berkeley Lab., Calif. (U.S.A.), Jan. 1986, Report No. LBL 20659). However, it has not hitherto been known to use Li/Li$_3$N as an anode material.

The new anode material has reduced chemical/electrochemical activity towards electrolyte especially at the anode/electrolyte interface, can recycle lithium at very high efficiencies and exhibits no cell voltage losses. Li/Li$_3$N significantly reduces the rate of interaction between elemental lithium and electrolyte during charge/discharge cycling and in storage. Therefore, an improved lithium-based anode material formed of lithium and lithium nitride, employable with a suitable electrolyte, separator and cathode for use in an electrochemical cell, and, in particular, a lithium rechargeable cell, is contemplated.

Lithium nitride is known to have the highest Li+ ion conductivity of any inorganic lithium salt and has been extensively studied as a solid electrolyte in solid state cells. However, the relatively low decomposition potential of lithium nitride (Ed$_d$=0.44V) has limited its commercial use in solid state cells. By contrast, lithium nitride is thermodynamically stable to lithium metal and, in combination with lithium metal, forms a very stable anode material.

DETAILED DESCRIPTION OF THE PREFERRED EMBODIMENTS

Figure 1:
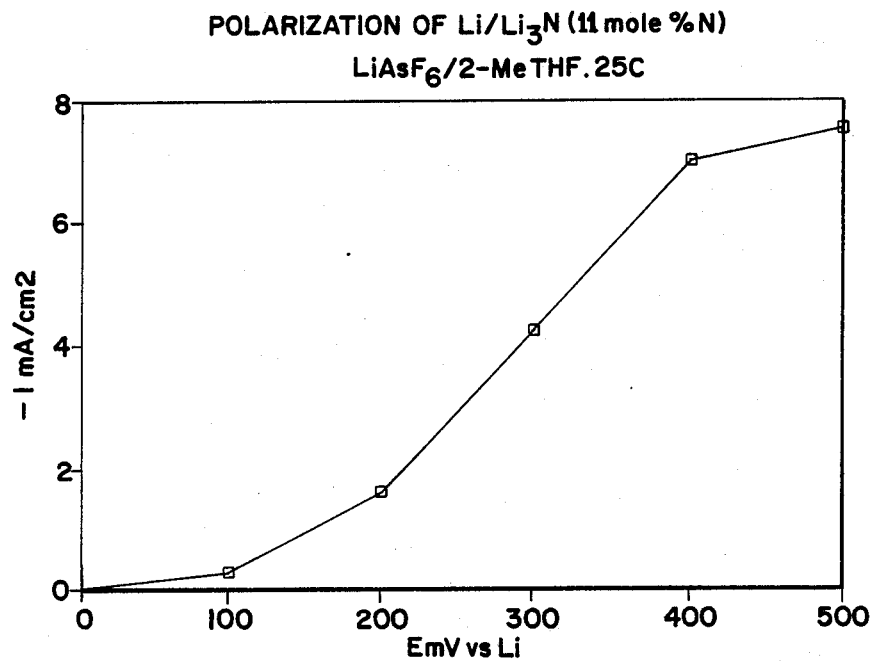
FIG. 1 is the polarization curve of Li/Li$_3$N (11 mole % N) in 1M LiAsF$_6$/2-MeTHF electrolyte at room temperature.

Anode material according to the invention can be prepared by melting lithium metal foil in a crucible in an argon-filled dry box, adding nitrogen in the form of lithium nitride powder, nitrogen gas or other suitable nitrogen-containing material to form a homogeneous material, and cooling the material to room temperature. The anode material so formed comprises a solid solution of lithium metal and lithium nitride. Whether nitrogen is added to liquid lithium in the form of lithium nitride, nitrogen gas, or any other nitrogen-containing substance that will release its nitrogen in molten lithium, it has been found that the nitrogen in the solution or mixture is in the form of lithium nitride. The exact composition of the Li/Li$_3$N material is dependent on the process temperature and cooling rate. The temperature dependency is partially defined by the material's phase diagram (see P. F. Adams et al. *J. of the Less-Common Metals*, 42 (1975) 1–11, 325–334). Even small amounts of Li/Li$_3$N in the anode are considered an improvement over a pure lithium anode, and electrochemical cells employing such anodes are within the scope of this invention.

In the specific case of the 11 mole % N Li/Li$_3$N mixture used for the data represented herein, approximately 2 g Li$_3$N powder was slowly added to 2 g of molten lithium metal in a nickel crucible at approximately 300° C. The material was stirred for several minutes until homogeneous and was then cooled to room temperature. The resulting anode material was compressed at about 9000 lb/cm$^2$ into the desired shape.

The anode material can be rolled or extruded into a foil, which is considered a preferred form for use in electrochemical cells.

A 1.12 mole % nitrogen solid solution anode material was prepared by slowly dissolving 6.34 g of Li$_3$N in 108.21 g of pure molten lithium at a temperature of approximately 445° C. The molten solution was then poured into a mold having a large heat sink to permit rapid cooling. The material solidified almost immediately and the mold was transferred to an extruder for further processing.

In the anode material according to the present invention, the proportion of Li$_3$N in the mixture can be at any effective level. At levels at which the proportion of N in the mixture varies from about 0.06 to 20 mole percent, Li and Li$_3$N form a solid solution at elevated temperatures, yielding a satisfactory, homogeneous anode material. Within this broad range, a narrower range of about 0.1 to 10 mole percent N is considered preferable.

An electrochemical system that utilizes the Li/Li$_3$N anode includes a separator, an electrolyte, and a cathode.

Suitable separator materials include those commonly employed in lithium cells such as porous polypropylene and glass microfibre materials that are sufficiently porous and wettable by the appropriate electrolyte.

Suitable nonaqueous solvent systems for the electrolyte include all solvents normally employable in lithium cells with particular emphasis on aprotic ether or sulphur analogue systems, preferably dioxolanes, furans, glymes, methoxy methanes, glycol sulfites, sulfolanes, propylene carbonate and combinations thereof. Suitable lithium salts are selected based on their high solubility (e.g. =0.5M) and conductivity in the chosen solvent system but would include, more specifically, anions such as the perchlorates, sulfonates, acetates, borates, closoboranes, hexafluoro or tetrafluoro metallates, halides, aluminates and derivatives thereof. It should be emphasized that normal lithium foil anode dependencies and/or constraints on the choice of an electrolyte (e.g. solute/solvent combinations) do not apply for systems employing the Li/Li$_3$N anode material. That is, a much wider choice of electrolyte(s) may be used. Some of these electrolytes show considerably improved performance characteristics relative to standard lithium anode materials.

Solid electrolytes such as lithium nitride, lithium iodide and lithium aluminum nitride, as well as polymeric ionic conductors, or combinations thereof, may also be used in the present invention.

The use of electrolytes based on inorganic solvents such as sulfur dioxide, thionyl chloride or sulfuryl chloride, with an appropriate conductive lithium salt, is also contemplated.

A suitable cathode includes any of those described in the technical and patent literature for lithium-based electrochemical systems. For example cathodes comprising a halogen or halide, a metal oxide, sulphides, selenides, oxyhalides, sulfur dioxide and carbon can be used. Cathodes having an active material comprising a chalcogen or chalcogenide compound of a transition metal are also suitable. In the case of rechargeable cells, the use of intercalation-type materials and the transition metal sulphides (e.g. TiS$_2$ or MoS$_2$) or oxides (e.g. V$_6$O$_{13}$), is preferred.

Anodes made according to the invention may be comprised solely or substantially solely of Li/Li$_3$N, or they may be comprised of composite materials, of which Li/Li$_3$N is one component. For example, anode compositions comprising plastic or elastomeric macromolecular material with electronic conduction, lithium alloys and carbon compounds are described in U.S. Pat. No. 4,517,265 to Belanger et al. Similar anode compositions may be made according to the present invention which would include Li/Li$_3$N as a component.

Similarly, it is known to use alloys of lithium and aluminum as an anode material (e.g. U.S. Pat. No. 4,002,492 to Rao). Anodes may be made according to the present invention using mixtures of Li/Li$_3$N and lithium-aluminum alloys, or mixtures of lithium nitride and lithium-aluminum alloys.

The use of other lithium alloys as anode materials is also known in the art, and the use of mixtures of lithium nitride and one or more lithium alloys such as Li—Si, Li—Sn, Li—Fe, Li—Sb, Li—Bi, Li—B, Li—Pb, Li—As, etc. and other combinations thereof as anode materials is contemplated according to the present invention.

As shown in FIG. 1 of the drawings, the polarization curve of Li/Li$_3$N at room temperature demonstrates that upon the anodic step the current rises to high values. Despite the relatively low decomposition potential of Li$_3$N (0.40V), the cell utilizing Li/Li$_3$N can be discharged up to 7.0 mA/cm$^2$ in a majority of aprotic solvents commonly used in lithium rechargeable cells. The polarization curve also indicates that Li/Li$_3$N anodes cycled at low current densities will show only minor overpotentials. In these cases, the overpotentials are less than the decomposition potential of Li$_3$N.

Figure 2:
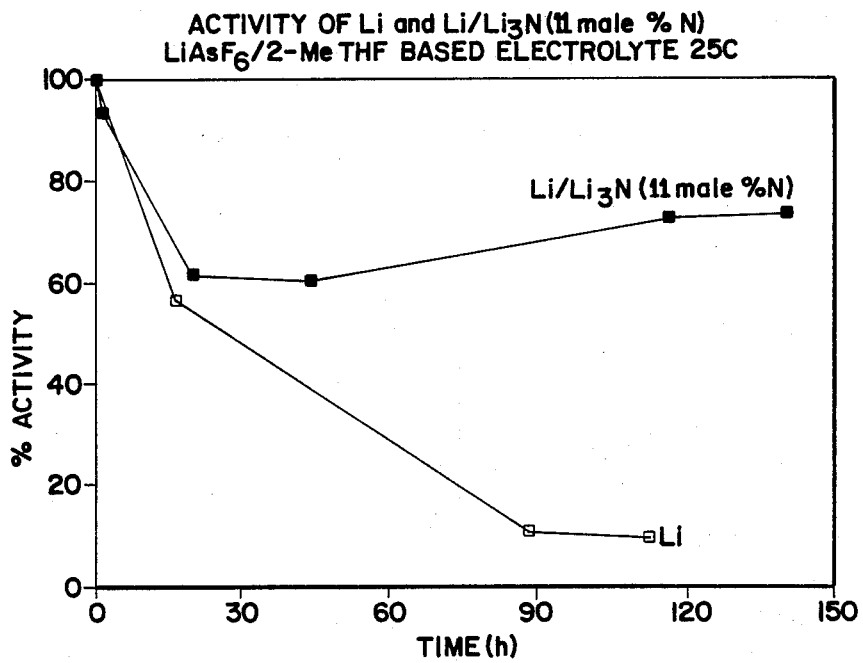
FIGS. 2 and 3 illustrate the activity of Li/Li$_3$N (11 mole % N) and pure lithium electrodes during storage time in 1M LiAsF$_6$/2-MeTHF based electrolyte and 1M LiAsF$_6$/THF electrolyte respectively at room temperature.

FIG. 2 demonstrates the relative activity of lithium metal and Li/Li$_3$N during storage time at room temperature. In general, the formation of insulating layers on the electrode during storage periods causes an associated reduction of its active surface. The evolution of the corresponding activity loss has been followed by measuring the ratio $i_t/i_o$ ($i_o$ is the exchange current at initial time, $i_t$ is the exchange current after a specified time later) by means of AC impedance spectroscopy at the end of initial treatment ($i_o$) and after a standing time (t) on open circuit ($i_t$). The curves in FIG. 2 show that the chemical stability of the lithium versus the electrolyte decreases severely with time, while Li/Li$_3$N shows an excellent stability versus solvent under similar experimental conditions.

Figure 3:
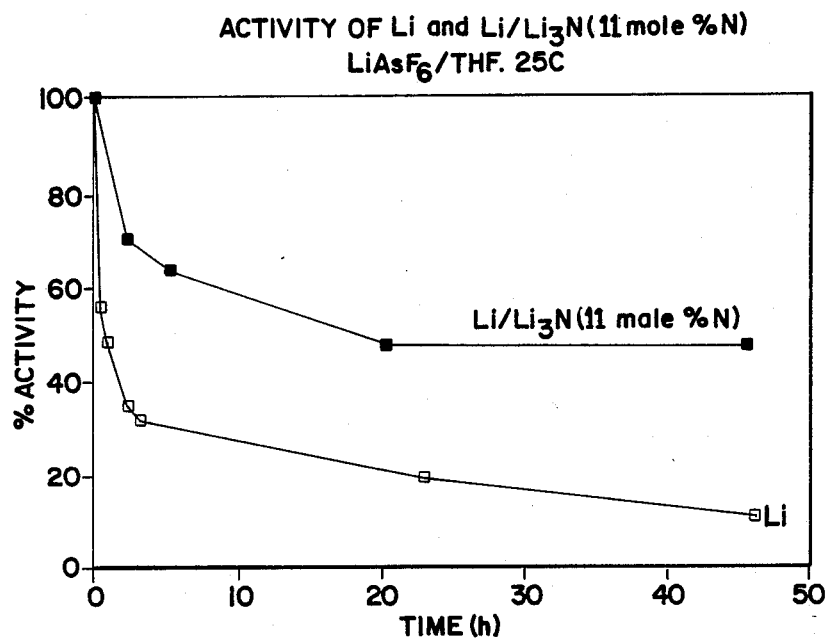

A similar experiment was carried out employing a relatively more reactive solvent such as tetrahydrofuran ("THF"). It is well known that THF is too reactive for use in secondary cells. Even very pure THF reacts rapidly with lithium and formation of a gel-like film. It is readily apparent from FIG. 3 that the surface activity of Li/Li$_3$N decreases moderately during a 50 hour storage time at room temperature, while the surface of a pure lithium electrode became entirely inactive during the same period.

These physical phenomenon support the conclusion that Li/Li$_3$N offers a significantly longer shelf life, in which an immobile host material such as Li$_3$N promotes a uniform lithium distribution of reduced activity. This is particularly true for the lithium electrodes in primary cells where one constantly faces problems resulting from the presence of passivating layers at the surface of the lithium metal which limit the transport of the active materials to the interface. Moreover, excessive passivation of the pure lithium anode entails a long delay time for the attainment of a steady state cell voltage on initial discharge. All these problems can be alleviated markedly by employing a Li/Li$_3$N anode, where substantially reduced chemical activity is observed.

Moreover, cells employing Li/Li$_3$N anodes could be extremely important in present day primary cell technology. One of the most promising of these is the lithium thionyl chloride cell, in which LiAlCl$_4$ is added to the liquid thionyl chloride in order to increase the conductivity and facilitate Li+ ion transport. The high stability of lithium in LiAlCl$_4$/SOCl$_2$ solution is due to a protecting surface film of LiCl which is formed as the electrode makes contact with the electrolyte. While the film makes it possible to construct a battery from a thermodynamically unstable combination such as Li in SOCl$_2$, an attendent voltage delay must be overcome in order to have a practical system.

Figure 4:
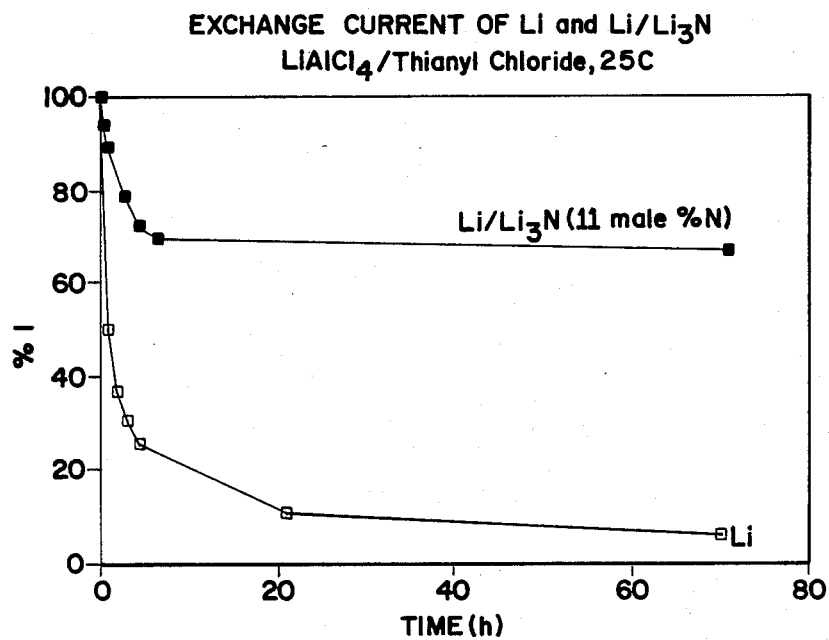
FIG. 4 illustrates the exchange current of Li/Li$_3$N (11 mole % N) and pure lithium electrodes in LiAlCl$_4$/thionyl chloride electrolyte at room temperature.

In this connection, Li/Li$_3$N electrodes have been studied in thionyl chloride and sulfur dioxide solutions. FIG. 4 depicts the percentage of the exchange current of the cell employing Li and Li/Li$_3$N (11 mole % N) in thionyl chloride/LiAlCl$_4$ (1.6M) during storage at room temperature. The magnitude of exchange current is indicative of the surface activity of the electrode which is in turn directly related to the thickness of the passive film formed on the electrode surface. It is readily apparent in FIG. 4 that the exchange current of the lithium electrode decreases with increasing storage time, while the cell utilizing a Li/Li$_3$N electrode exhibits a greater exchange current under similar experimental conditions.

The LiCl film which grows continuously on lithium causes an initial voltage delay, as has been reported previously. It is further believed that the initial voltage delay of the Li/SOCl$_2$ cell depends on the effective LiCl film thickness growth rate. Thus, the initial voltage delay of a cell utilizing a Li/Li$_3$N anode would be significantly smaller than the cell utilizing a Li metal anode. This is particularly true for longer storage times, where the Li cell suffers significantly from the continuous growth of LiCl film on the lithium with a corresponding gradual increase in the cell's initial voltage delay.

Figure 5:
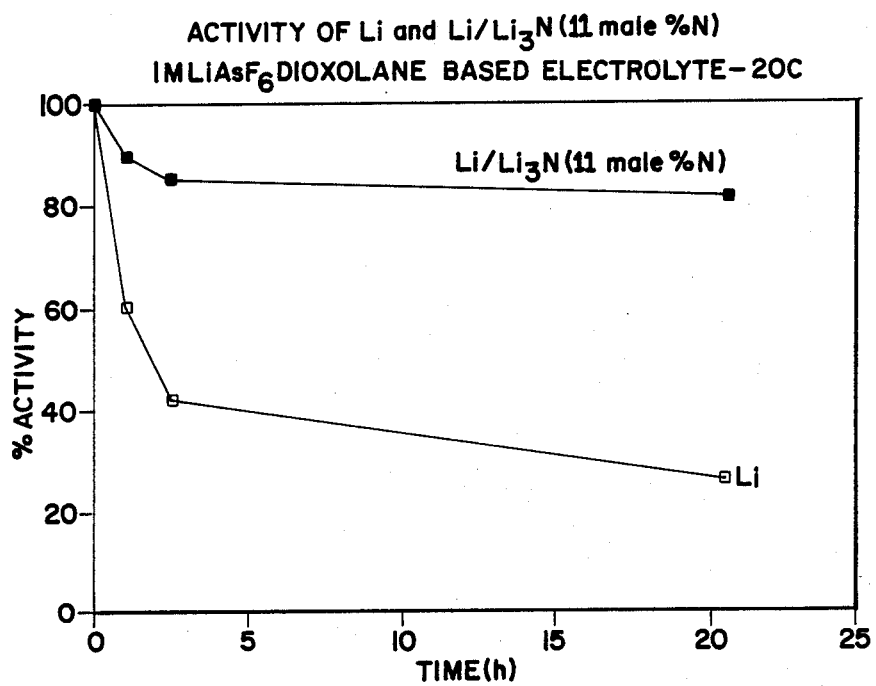
FIG. 5 illustrates the extent of passivation of pure lithium and Li/Li$_3$N (11 mole % N) during anodic step in a 1M LiAsF$_6$ dioxolane-based electrolyte at −20° C.

FIG. 5 illustrates the activity of lithium metal and Li/Li$_3$N during anodic stripping at 1.0 mA/cm$^2$ at $-20°$ C. The formation of insulating layers at the lithium metal surface is readily apparent in FIG. 5. These layers have been attributed to solvent polymerization initiated by LiAsF$_6$ decomposition products. Deterioration of the electrochemical properties of the metal/electrolyte interface due to the formation of passivating layers could be ascribed to a significant ohmic drop overpotential resulted from lower conductivity as well as higher viscosity of the electrolyte at lower temperatures. Consequently, this limits the amount of lithium metal in each cycle. It is further evident from FIG. 5 that the extent of passivation of Li/Li$_3$N is not as severe as that for lithium electrodes at $-20°$ C. during an anodic stripping at 1.0 mA/cm$^2$, despite the greater ohmic drop of the cell utilizing Li/Li$_3$N.

Figure 6:
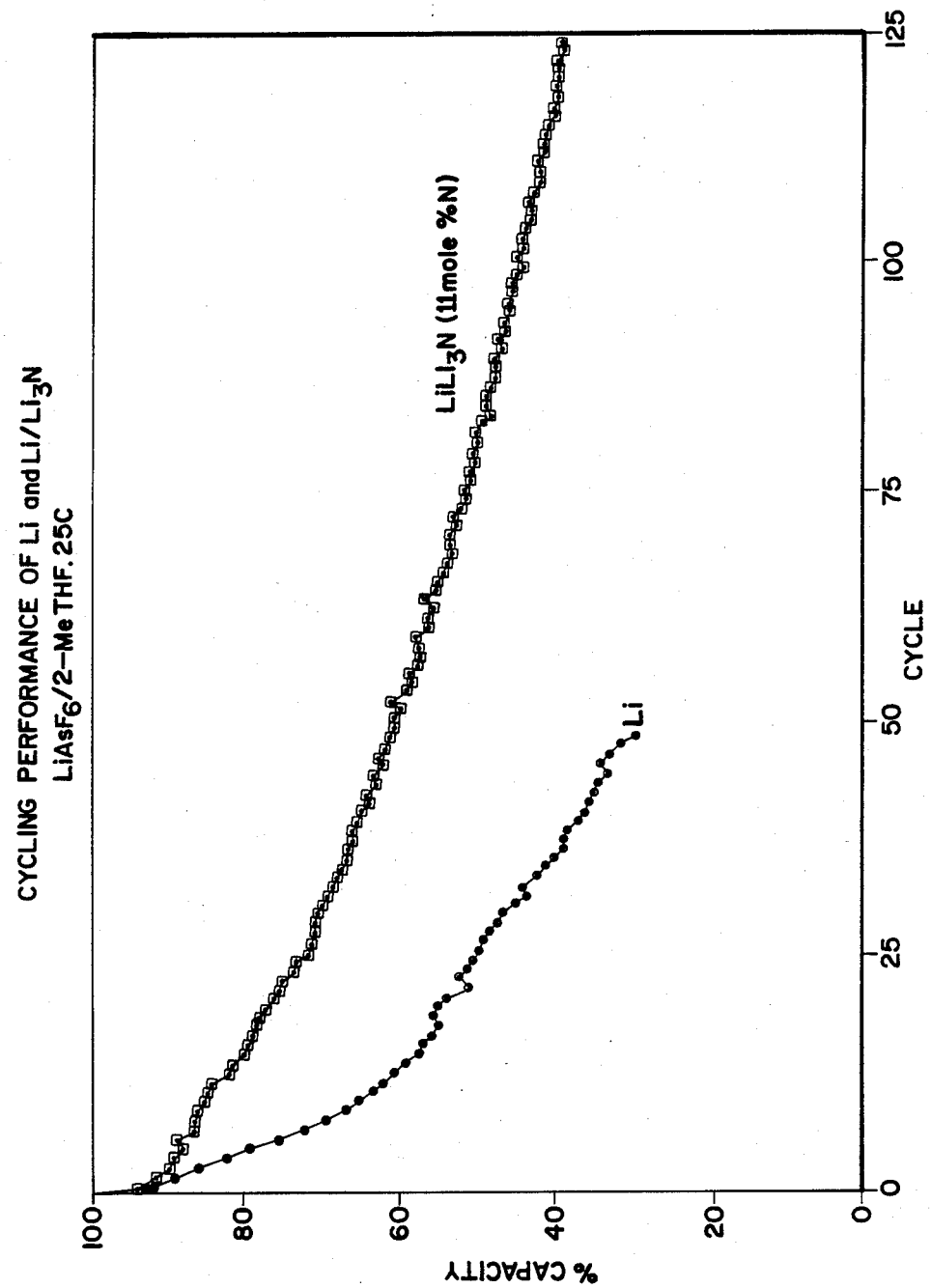
FIG. 6 illustrates the cycling performance of lithium and Li/Li$_3$N electrodes (11 mole % N) in a 1M LiAsF$_6$/2-MeTHF electrolyte at room temperature.

FIG. 6 shows the discharge capacity of lithium and Li/Li$_3$N as a function of cycle number at room temperature. The cathode was made from an intercalation material, namely TiS$_2$. The cell was completed with a glass fiber separator soaked with 1O 1 M LiAsF$_6$ in 2-methyltetrahydrofuran. The results of the cycling experiment demonstrate the higher theoretical capacity of the Li/Li$_3$N electrode relative to pure lithium anodes after cycling. In further testing, the cell utilizing a pure lithium anode completed only 50 cycles at 30% of its theoretical capacity, while the cell utilizing a Li/Li$_3$N anode completed 125 cycles at 40% of its theoretical capacity.

From the above data, it may be appreciated that the present invention provides a viable solution to numerous problems associated with the use of pure lithium metal anodes in lithium galvanic cells and, in particular, lithium rechargeable cells. A suggested explanation for the superior properties of Li/Li$_3$N as an anode material relates to the formation of micropores at the surface of the electrode during discharge processing. The porous Li/Li$_3$N electrode formed on discharge may act as a three dimensional electrode, thereby reducing significantly the local current density and eliminating the mass redistribution of lithium on extending cycling. Furthermore, morphological studies performed on Li/Li$_3$N by means of a scanning electron microscope have shown that anodic polarization effectively cleans the anode surface. The microporous structure of the substrate was clearly revealed after the electrode surface was anodically polarized at about +50 mV overpotential and 10 coulombs/cm$_2$ charge density.

During the cathodic step, the lithium began to grow on a clean surface. It is suggested that the improvement in the electrode properties is directly linked to the presence of microcavities generated at the electrode surface during the initial anodic step. Moreover, the incorporation of lithium into the Li/Li$_3$N anode during subsequent cathodic steps would take place through these microcavities. However, the dimension of the cavities only ensures the passage of small molecules such as lithium while bulkier solvent molecules are not able to penetrate into the cavities. Based on this model, the first anodic polarization plays a determinant role in the quality of the electrode's properties, and generation of cavities which permit the passage of lithium ions alone and not the solvent or solute molecules. As part of this model, it is further contemplated that lithium nitride in addition to acting as a host species may also promote lithium ion conductivity within the anode. In addition, preliminary lithium NMR studies indicate complete delocalization of lithium electrons which averages out and lowers the total lithium reactivity. It is believed that a combination of all these effects results in improved cycle and longer shelf life as observed in the studies of the Li/Li$_3$N electrode.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. An electrochemical cell comprising:
   (a) an anode comprising only a solid solution of lithium metal and lithium nitride;
   (b) a cathode;
   (c) a non-aqueous electrolyte comprising a solvent and a lithium salt dissolved therein; and
   (d) a porous separator.

2. An electrochemical cell comprising:
   (a) an anode comprising a solid solution of lithium metal and lithium nitride, wherein the proportion of nitrogen in said solution is in the range of about 0.06 to 20 mole percent;
   (b) a cathode;
   (c) a non-aqueous electrolyte comprising a solvent and a lithium salt dissolved therein; and
   (d) a porous separator.

3. An electrochemical cell in accordance with claim 2, wherein the proportion of nitrogen in said solution is in the range of about 0.1 to 10 mole percent.

4. An electrochemical cell comprising:
   (a) an anode comprising a solid solution of lithium nitride and an alloy selected from the group consisting of Li—Al, Li—Si, Li—Sn, Li—Fe, Li—Sb, Li—Bi, Li—B and Li—Pb, wherein the proportion of nitrogen in the said solution is in the range of about 0.06 to 20 mole percent;
   (b) a cathode;
   (c) a non-aqueous electrolyte comprising a solvent and a lithium salt dissolved therein; and
   (d) a porous separator.

5. An electrochemical cell according to claim 2, wherein said porous separator comprises polypropylene.

6. An electrochemical cell according to claim 2, wherein said porous separator comprises glass microfiber material.

7. An electrochemical cell according to claim 2, wherein said lithium salt has an anion selected from the group consisting of halide ions, hexafluorometallate ions, tetrafluorometallate ions, perchlorate ions, sulfonate ions, borate ions, thiocyanate ions, aluminate ions, closoborane ions and acetate ions and derivatives thereof.

8. An electrochemical cell according to claim 2, wherein said solvent is an organic solvent selected from the group consisting of ethers, dioxolanes, furans, glymes, glycol sulfites, sulfolanes and carbonates.

9. An electrochemical cell according to claim 2, wherein the cathode active material comprises a chalcogen or chalcogenide compound of a transition metal.

10. An electrochemical cell according to claim 2, wherein said cathode comprises a substance selected from the group comprising a halogen, a halide, a metal oxide, a sulphide, a selenide, an oxyhalide, sulfur dioxide and carbon.

11. An electrochemical cell according to claim 2, wherein said electrolyte comprises a conductive, lithium salt and an inorganic solvent selected from the group consisting of sulfur dioxide, thionyl chloride and sulfuryl chloride.

12. An electrochemical cell according to claim 4, wherein said porous separator comprises polypropylene.

13. An electrochemical cell according to claim 4, wherein said porous separator comprises glass microfiber material.

14. An electrochemical cell according to claim 4, wherein said lithium salt has an anion selected from the group consisting of halide ions, hexafluorometallate ions, tetrafluorometallate ions, perchlorate ions, sulfonate ions, borate ions, thiocyanate ions, aluminate ions, closoborane ions and acetate ions and derivatives thereof.

15. An electrochemical cell according to claim 4, wherein said solvent is an organic solvent selected from the group consisting of ethers, dioxolanes, furans, glymes, glycol sulfites, sulfolanes and carbonates.

16. An electrochemical cell according to claim 4, wherein the cathode active material comprises a chalcogen or chalcogenide compound of a transition metal.

17. An electrochemical cell according to claim 4, wherein said cathode comprises substance selected from the group comprising a halogen, a halide, a metal oxide, a sulphide, a selenide, an oxyhalide, sulfur dioxide and carbon.

18. An electrochemical cell according to claim 4, wherein said electrolyte comprises a conductive, lithium salt and an inorganic solvent selected from the group consisting of sulfur dioxide, thionyl chloride and sulfuryl chloride.

19. An electrochemical cell comprising:
   (a) an anode comprising a solid solution of lithium metal and lithium nitride, wherein the proportion of nitrogen in said solution is in the range of about 0.06 to 20 mole percent;
   (b) a cathode; and
   (c) a solid electrolyte.

20. An electrochemical cell according to claim 19, wherein said electrolyte is selected from the group consisting of lithium nitride, lithium iodide and lithium aluminum nitride.

21. An electrochemical cell according to claim 19, wherein said electrolyte is a polymeric ionic conductor.

22. An electrochemical cell comprising:
   (a) an anode comprising a solid solution of lithium nitride and an alloy selected from the group consisting of Li—Al, Li—Si, Li—Sn, Li—Fe, Li—Sb, Li—Bi, Li—B and Li—Pb, wherein the proportion of nitrogen in the said solution is in the range of about 0.06 to 20 mole percent;
   (b) a cathode; and
   (c) a solid electrolyte.

23. An electrochemical cell according to claim 22, wherein said electrolyte is selected from the group consisting of lithium nitride, lithium iodide and lithium aluminum nitride.

24. An electrochemical cell according to claim 22, wherein said electrolyte is a polymeric ionic conductor.

* * * * *